(12) United States Patent
Bonney

(10) Patent No.: US 10,221,875 B2
(45) Date of Patent: Mar. 5, 2019

(54) LOCKING MORTISE AND TENON JOINT

(71) Applicant: Kerry David Bonney, Minot, ME (US)

(72) Inventor: Kerry David Bonney, Minot, ME (US)

(*) Notice: Subject to any disclaimer, the term of this patent is extended or adjusted under 35 U.S.C. 154(b) by 770 days.

(21) Appl. No.: 14/793,703

(22) Filed: Jul. 7, 2015

(65) Prior Publication Data
US 2016/0025125 A1    Jan. 28, 2016

Related U.S. Application Data

(60) Provisional application No. 62/021,813, filed on Jul. 8, 2014.

(51) Int. Cl.
*F16B 12/12* (2006.01)
*F16B 12/46* (2006.01)

(52) U.S. Cl.
CPC ...... *F16B 12/125* (2013.01); *F16B 2012/466* (2013.01)

(58) Field of Classification Search
CPC ........... A47C 4/02; A47C 4/021; A47C 4/028; A47C 4/03; A47B 57/36; F16B 12/125; F16B 12/24; F16B 12/00
See application file for complete search history.

(56) References Cited

U.S. PATENT DOCUMENTS

| | | | |
|---|---|---|---|
| 2,366,676 A * | 1/1945 | Rosenthal | A47B 47/042 108/180 |
| 2,866,239 A * | 12/1958 | Lambert | E04B 1/6137 403/376 |
| 3,788,700 A * | 1/1974 | Wartes | A47B 3/00 108/101 |
| 4,082,356 A * | 4/1978 | Johnson | A47C 4/021 273/160 |
| 4,082,389 A * | 4/1978 | Stewart | A47B 43/04 312/258 |
| 4,140,065 A * | 2/1979 | Chacon | A47C 4/021 108/156 |
| 4,191,113 A * | 3/1980 | Hogberg | A47C 4/021 108/157.16 |
| 4,201,417 A * | 5/1980 | Griffith | A47C 4/02 297/440.13 |
| 4,436,342 A * | 3/1984 | Nilson | F16B 12/20 297/239 |
| 4,655,017 A * | 4/1987 | Bond | E04F 11/032 52/187 |
| 4,890,953 A * | 1/1990 | Malatesta | E04B 1/2604 144/354 |
| 5,279,232 A * | 1/1994 | Gollick | F16B 12/24 108/109 |
| 5,359,828 A * | 11/1994 | Day | G09F 7/18 403/247 |
| 7,533,940 B1 * | 5/2009 | Zook | A47B 83/02 108/11 |
| 8,316,606 B2 * | 11/2012 | Siewert | E04F 13/10 52/483.1 |
| 9,833,085 B2 * | 12/2017 | Adair | A47F 3/12 |

(Continued)

*Primary Examiner* — Daniel J Wiley

(57) ABSTRACT

A mortise and tenon joint of two or more structural members wherein mortise and tenon are securely joined by moveable wedges in a locking mechanism. Several locking mechanisms, including hinged structures, are disclosed in which moveable wedges forcibly move the tenon and mortise in opposite directions thereby drawing the tenon into the mortise.

6 Claims, 30 Drawing Sheets

(56) References Cited

U.S. PATENT DOCUMENTS

| | | | |
|---|---|---|---|
| 2007/0102986 A1* | 5/2007 | Buhrman | A47C 3/34 297/440.13 |
| 2012/0045278 A1* | 2/2012 | Schooley | F16B 12/125 403/381 |
| 2012/0107042 A1* | 5/2012 | Schneider | F16B 3/00 403/343 |

* cited by examiner

LOCKING MORTISE AND TENON JOINT

BACKGROUND

The invention relates generally to a system for connecting two or more structural members. More particularly, the invention relates to a system appropriate for joining structural members inherent in the construction of furniture. While furniture is the principal focus of the invention, it is also suitable for interconnecting structural frames for various types of temporary buildings, scaffolding, work benches/supports or any other purpose which could benefit from quick and secure joinery, connection or attachment.

Many types of home furniture (indoor and outdoor) are constructed by connecting a horizontal frame segment to a vertical frame segment by means of traditional mortise and tenon joinery. Although simple and strong, these joints require glue, nails, screws, lag bolts, through bolts, pins, dowels and/or wedges to function as designed. There are many examples of this type of structure, such as chair rails, bed frames, table legs, stretchers and cabinetry in general. Furniture makers construct these joints by inserting a male tenon end on one segment into a female mortised channel on another segment. When the joint is meant to be a permanent connection, furniture makers secure the joint with glue, dowels, pins, screws, nails, wedges or through bolts (or combinations thereof). When the joint is meant to be nonpermanent (e.g. a bed frame), the furniture maker uses a joint that locks together but allows the furniture to be disassembled. Traditionally, these joints are formed using the same mortise and tenon connection described above, but employ lag bolts, nuts and bolts, screws, wedges or removable dowels to secure the structural members. This invention concerns the nonpermanent methods available to furniture makers and will allow quick and easy assembly and disassembly of structural members, without tools, while improving the integrity and strength of the connection.

SUMMARY

This invention concerns a mortise and tenon joint of two structural members connected by a mechanical clamp (henceforth referred to as a "lock") rather than by traditional glue, nails, screws, lag bolts, through bolts, pins, dowels and/or wedges.

The system functions by forcing the tenon tight to the receiving mortise in a manner similar to a traditional drawbored mortise and tenon joint. However, rather than using permanently placed offset dowels to pull the tenon tight, a lock (clamp) is used, thus securing, until released, two structural members. This is accomplished by introducing rollers, wedges, blades or similar restraints (henceforth referred to as simply "wedges") into grooves and/or openings in the tenon once it is fully seated in the mortise. The grooves, if on the outside of the tenon, will be placed on opposite sides of the tenon and could be positioned on either the long or short sides. There exists the possibility that only one side (or all sides) could be used in a similar fashion, however. Openings passing through the tenon face can also be used; the grooves will function in the same manner as the above cited example.

In any configuration, the lock clamps the tenon to the mortise by exerting pressure against the sides of the grooves in the tenon and the mortise, either inwardly as in the case of the external design or outwardly for the internal version. The design of the grooves/openings in the tenon situates them just below the surface of the mortise when fully seated so that when engaged, the restraints (rollers, wedges etc) pry against the mortise with tremendous force. This method of attachment differs from traditional wedge applications in that the tenon is not made to "split" or otherwise be forced against the mortise sides to secure it. Rather, the locking force is applied against the base (or opening) of the mortise by the rollers, wedges or other restraints which either extend past the mortise opening and pry the tenon "through" the mortise or in the case of the sliding tenon, redirect the force of the lock against the tenon and the inside of the mortise.

Mortises, for this invention, are not required to be located in a furniture leg or rail (as is tradition); they can be located anywhere and assume many configurations. Mortises, as defined for this invention, simply need to receive the tenon and provide a place of support against which the lock will work.

Tenons may be fixed or floating with fixed tenons being characterized by secure mounting to framework (either integrally or mechanically) while floating tenons are inserted or moved into position separate from the framework; a fixed tenon would be considered a traditional tenon. A floating tenon may have one or more sections (notched and/or recessed areas) to receive locks and may be located anywhere along the length of the tenon. The floating tenon may assume an infinite number of configurations, from a simple single tenon (one end receives, one end secures) to a double tenon (both ends receive) to a multiple tenon design where any number of ends exist in two or three dimensions. The receiving sections may even be placed in the interior of the tenon with the ends acting as supports.

An additional feature of the fixed tenon (and the floating tenon in certain configurations) is beveled shoulders. Beveled shoulders (shoulder being defined as the beginning or limiting point of the tenon) allow the tenon to be slightly undersized to facilitate ease of insertion/extraction into and out of the mortise while remaining in a centered and positively secure state when locked. Without the beveled shoulders, shifting (and thus wear) will occur with use. This wear (and eventual instability) is proportional to the "looseness" of the tenon in relation to the mortise and the use to which the joint is subjected. Beveled shoulders eliminate this outcome and allow the lock and the joint to function as intended.

The locks themselves are of two basic operating designs, from which many different configurations have been derived—inwardly clamping and outwardly clamping. Inwardly clamping locks are used with tenons grooved on opposing outer sides while outwardly clamping locks are required for interior openings. The openings (interior) and grooves (exterior) have no definitive shape; they simply provide a surface upon which pressure is applied to direct the tenon away from the mortise base. The openings and grooves may take the form of "vees", "diamonds", "semicircles", "crescents" or any other shape which facilitates the desired effect of pulling the tenon tight against the base of the mortise.

The wedges may be employed using any number of designs, from simple actions mimicking locking pliers or ammo box clamps to spring loaded blades which actuate automatically when a tenon is inserted into the mortise. Devises run from rudimentary "C" or "D" clamps to complicated electrically (or electronically) activated wedge clamps. Clamping action can be mechanical, spring, magnetic, hydraulic or any other method. Regardless of the restraining design used, the functionality remains the same—to direct force in such a way as to pull the tenon through the mortise by means of releasable, mechanical locks (clamps), using beveled shoulders to center and stabilize it. In any scenario, the locking action produces an extremely secure joint which constantly tightens under use; this stands in stark contrast to traditional joinery methods which only loosen with use.

No material has been claimed or specified; mortises, tenons and all manner of restraints are not limited in any way as to composition. Indeed, all items may be manufactured using wood, steel, plastic or any other such material as may be deemed practicable, including combinations of two or more materials (e.g. metal plates and/or brackets used with wood connectors).

It is not intended to limit the invention to the above examples only; many variations are possible without departing from the overall scope of the invention.

LIST OF NUMBERED ITEMS

Figure 1:
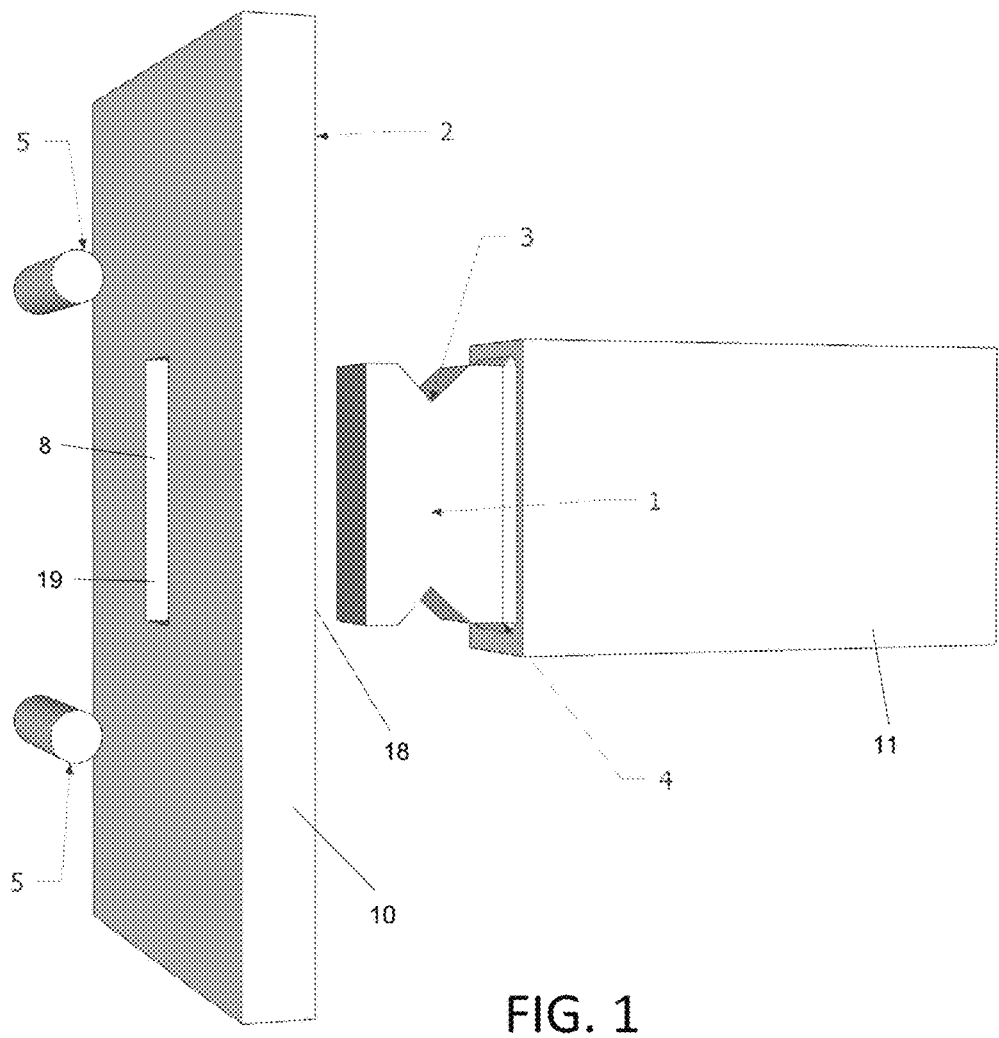
FIG. 1 is an exploded view of a preferred embodiment for the exterior locking version of the present invention, showing the mortise, tenon and wedge components.

1. Tenon
2. Mortise
3. Groove
4. Bevel on shoulder of tenon
5. Wedge
6. Bevel in receiving face of mortise
7. Post forming upright element
8. Mortise cavity
10. upright element 11. perpendicular element
13. Stop
14. Smaller aperture
16. Mortise restraint
17. Mortise face
18. Front opening
19. Rear opening
20. Void between mortise restraint 16 and groove 3
22. Open side
23. Closed side
24. Hinged structure
26. First articulating member of hinged device
27. Second articulating member of hinged device
28. Locking system

DETAILED DESCRIPTION OF PREFERRED EMBODIMENTS

Reference will now be made in detail to various exemplary embodiments of the invention. The following detailed description is presented for the purpose of describing certain embodiments in detail and is, thus, not to be considered as limiting the invention to the embodiments described. Rather, the true scope of the invention is defined by the claims.

Embodiments of the present invention provide connection methods for structural members involved in, but not exclusive to, furniture making and building construction. There are three major variations of the invention, although the variations themselves deviate little from the basic premise. For clarity in describing the invention, however, the first variation will be identified as an "external lock variant" and will have the locking features located on the face or edge of the tenon. The second variation will be known as the "internal lock variant", and as its name suggests, will have its locking features contained within the body of the tenon. This variant does itself have two major versions—one that uses an open end tenon and another that uses a closed end tenon. As needed, a distinction will be made between the two, but for the most part, they operate in the same manner. The third variation is referred to as the "rail variant". While the rail variant appears to be different from the other two, it actually functions in the same way; including its use of either the external or internal locking tenon designs.

A note: a mortise, for those skilled in the art, is defined as the actual opening in a structural member. However, as will be seen, in the rail variant of this invention the mortise actually becomes the structural member. Therefore, to keep things uniform, the drawings have arrows pointing to the structural member containing the mortise, not the mortise itself. When reference is made to the mortise 2, it is identifying the actual mortise and not the structural member (although in the rail variant, it is one in the same).

Turning now to detail in the drawings, FIG. 1 illustrates a mortise and tenon joint in the external lock variant of the invention. The mortise, for this invention will be a through mortise. The tenon 1 has a groove of tapered cross section 3 which accepts a moveable wedge 5 when fully seated in the mortise 2. In this particular embodiment, the moveable wedge 5 is restrained on the mortise by being wider than the mortise opening. However, the wedge 5 may also be restrained by other means, some of which are illustrated in alternative embodiments to follow. The groove 3 is cut in such a way as to remain below the back surface of the mortise 2, preventing the moveable wedge 5 from fully seating in the groove 3. This designed embodiment directs force against both the mortise 2 and the groove 3 pulling the tenon 1 through the mortise 2 when pressure is applied to the moveable wedge 5. The shoulders of the tenon 1 provide a limit on travel, just as in a traditional mortise and tenon design.

Figure 2:
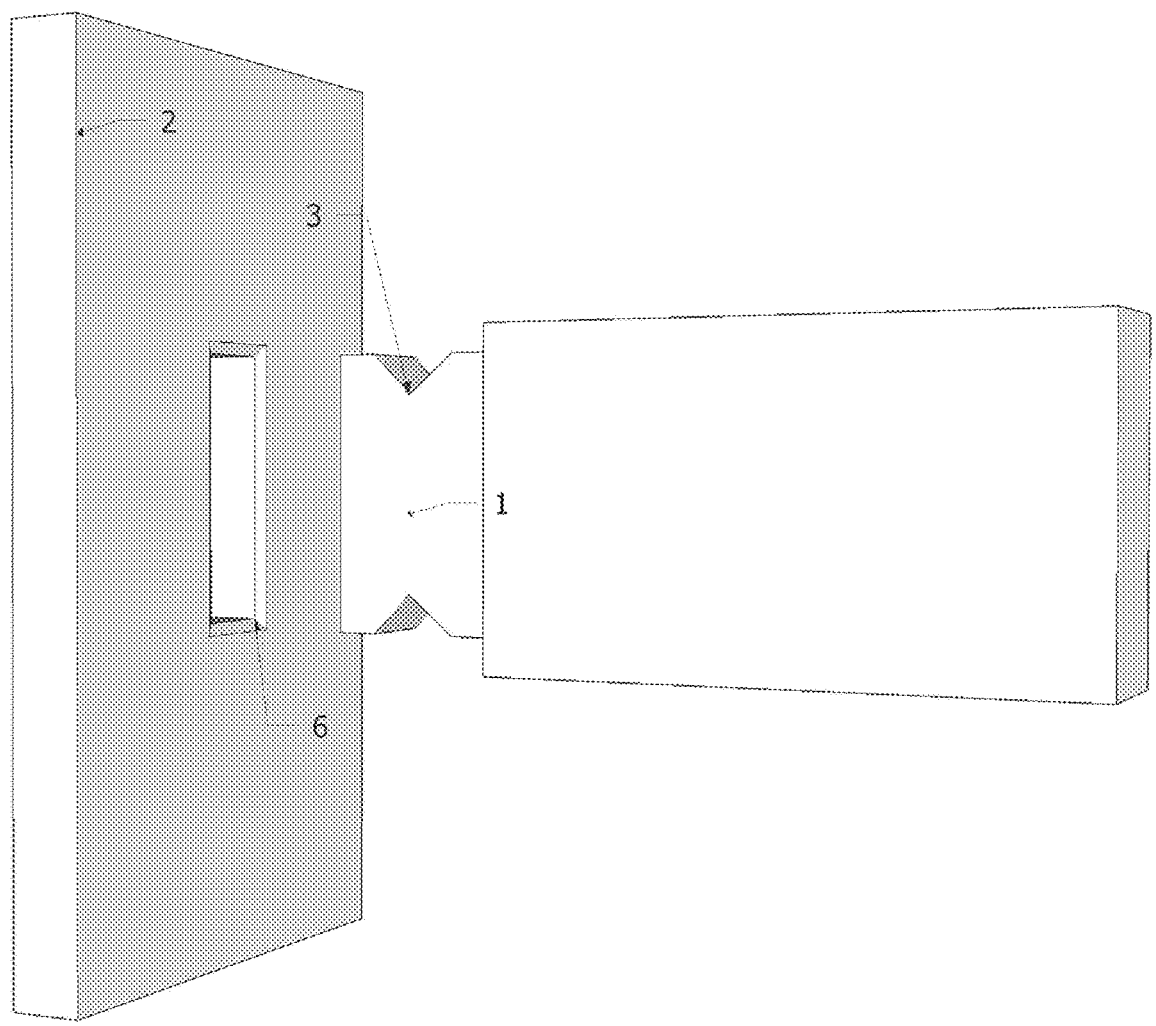
FIG. 2 is an exploded view of a preferred embodiment for the exterior locking version of the present invention showing the mortise and tenon mating surfaces.

The tenon 1 is designed to be slightly smaller in all facing dimensions than the mortise 2 that receives it. This feature allows the tenon 1 to enter and exit the mortise 2 freely, without binding. In order to center the tenon 1 on the mortise 2 and limit lateral movement when seated, a bevel 4 is provided around the shoulder of the tenon 1 and a corresponding bevel 6 is cut into the receiving face of the mortise 2 as shown in FIG. 2. The tenon bevel 4 and the mortise face bevel 6 are formed in such a manner as to provide only guidance in centering the tenon 1, allowing the shoulders of the tenon 1 to function traditionally as the limit to tenon travel.

Figure 3:
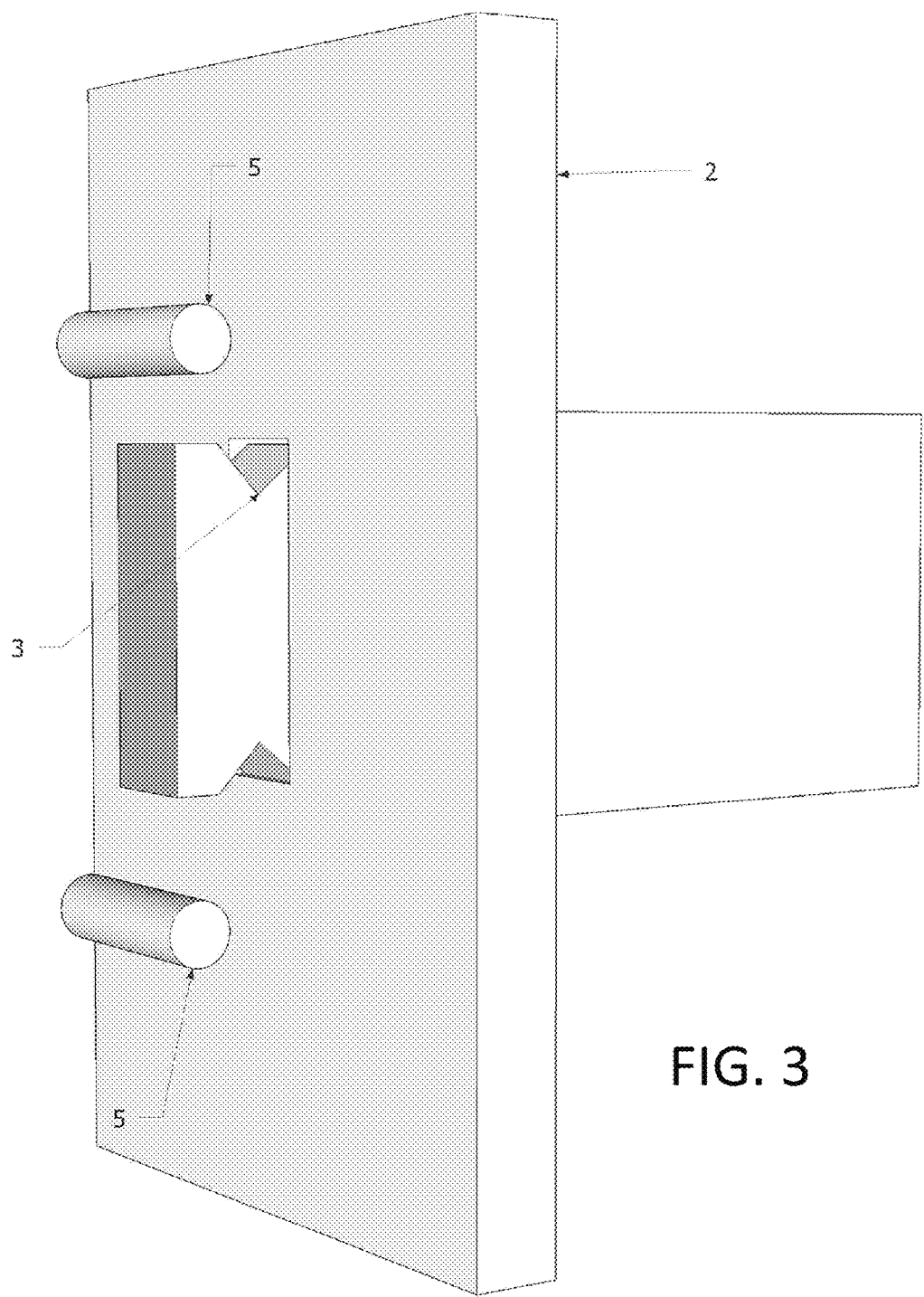
FIG. 3 is an exploded view of a preferred embodiment for the exterior locking version of the present invention showing the tenon fully seated in the mortise with the wedges in the unlocked position.
Figure 4:
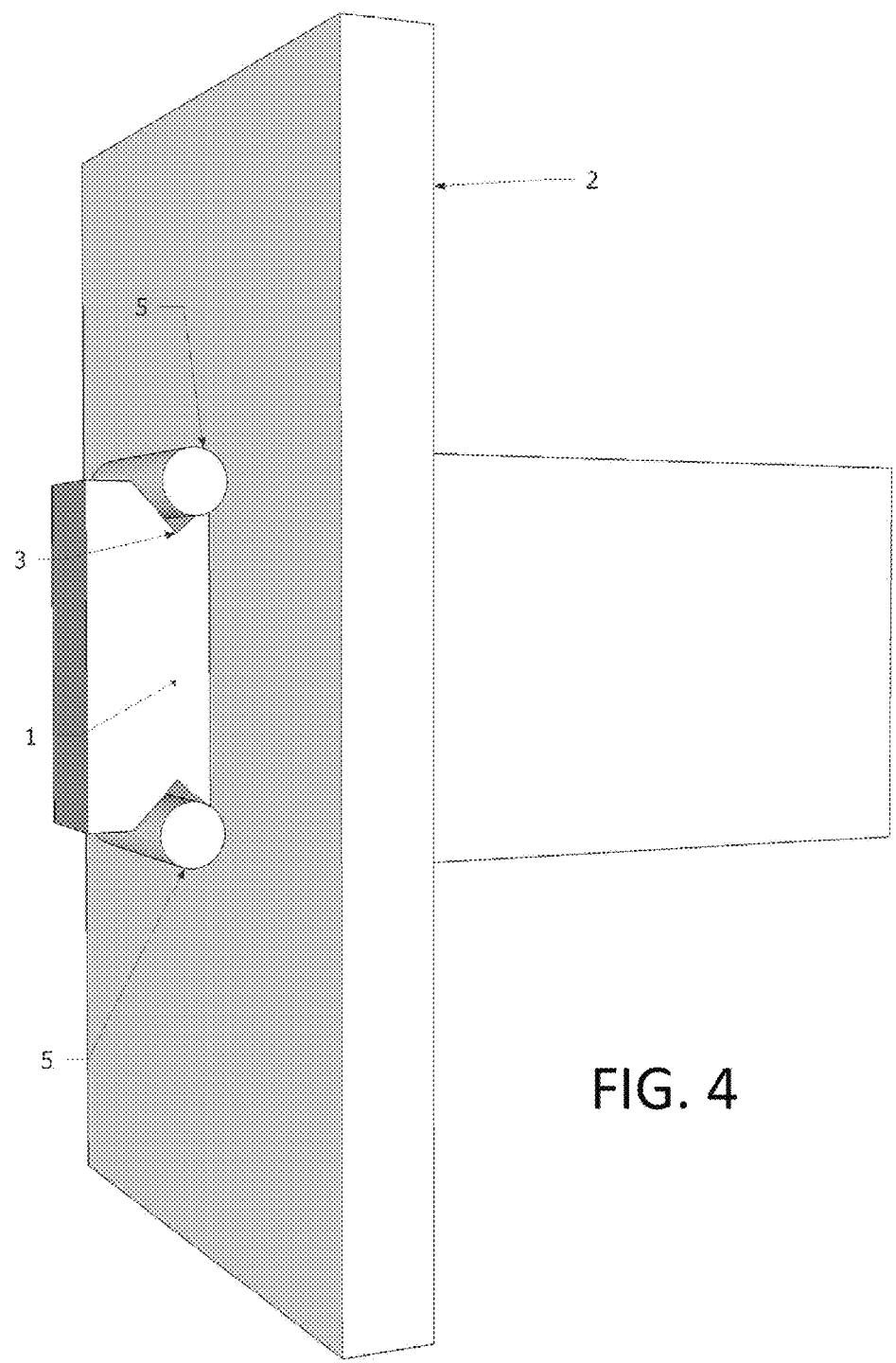
FIG. 4 is an exploded view of a preferred embodiment for the exterior locking version of the present invention showing the tenon fully seated in the mortise with the wedges in the locked position.

FIG. 3 shows the tenon 1 fully seated in the mortise 2 with the moveable wedge(s) 5 in the unlocked position and FIG. 4 shows the same relationship in the locked position. There exist limitless methods for accomplishing the locking action, from simple locking pliers and C/D clips to sophisticated mechanical, electrical, pneumatic or hydraulic actuators. The given examples of locks (clamps) used to provide the wedge operation are presented for the purpose of describing certain embodiments in detail and are, thus, not to be considered as limiting the invention to the embodiments described. Rather, the true scope of the invention is defined by the claims.

Figure 5:
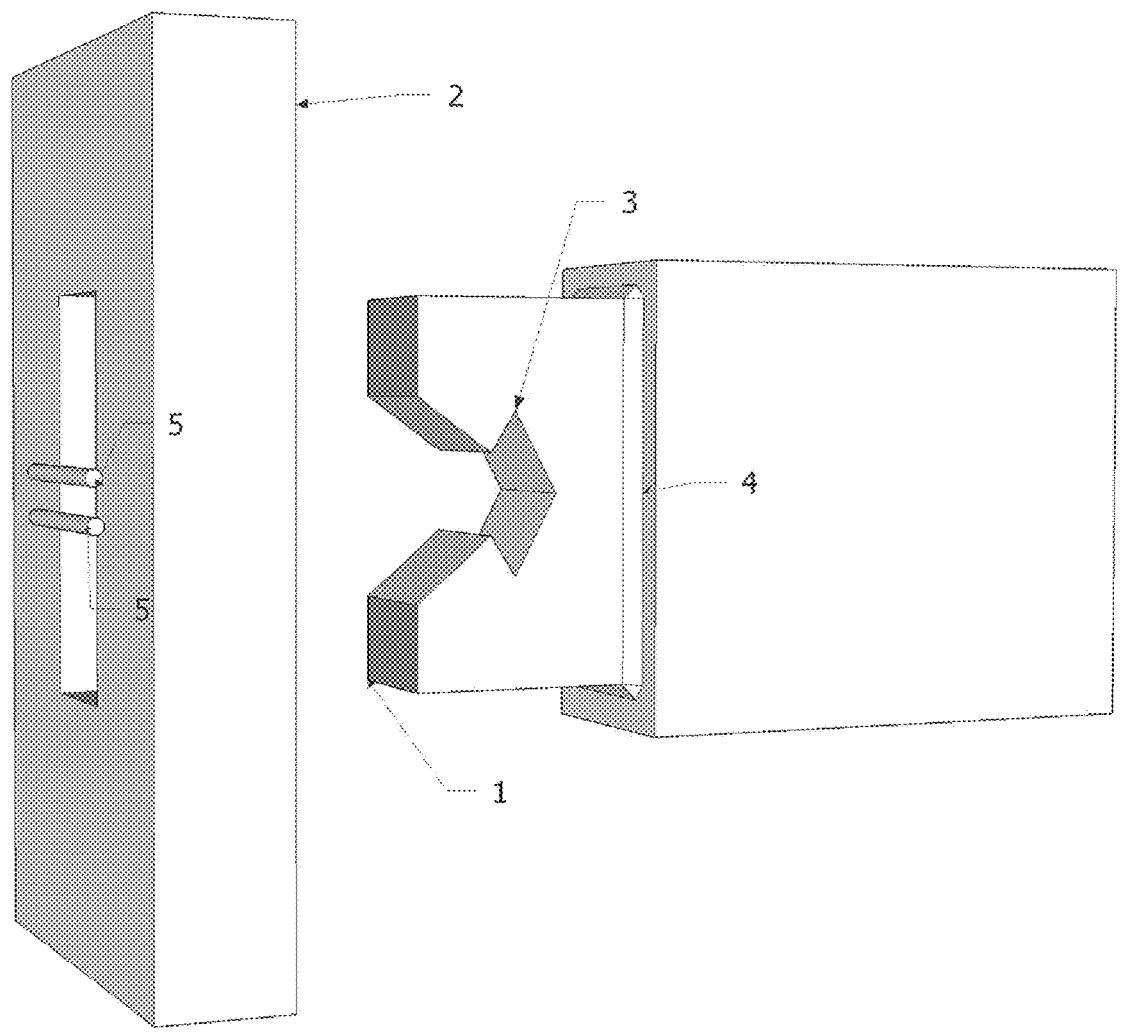
FIG. 5 is an exploded view of an alternative embodiment for the interior locking version of the present invention, showing the mortise, tenon and wedge components.
Figure 6:
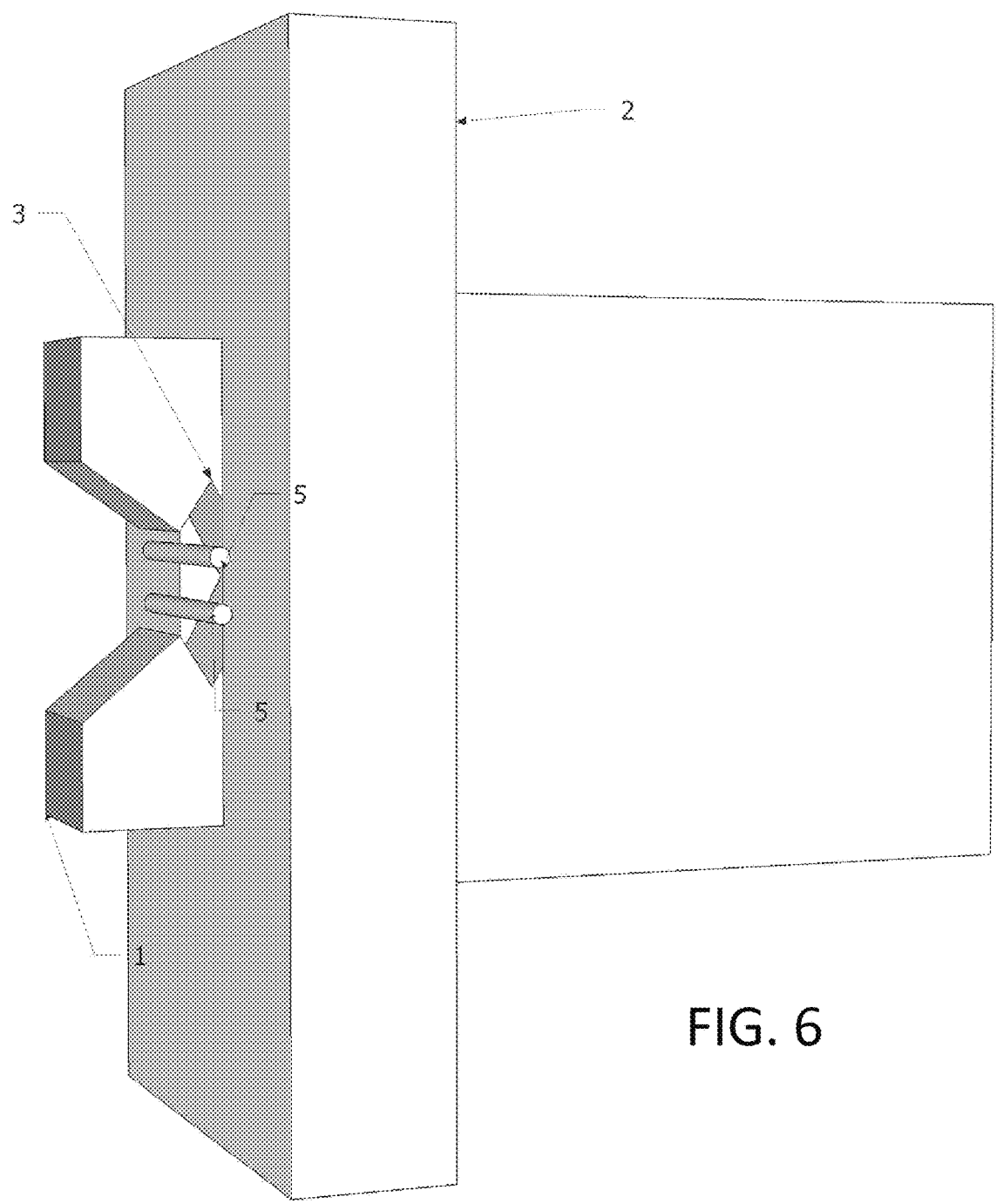
FIG. 6 is an exploded view of an alternative embodiment for the interior locking version of the present invention showing the tenon fully seated in the mortise with the wedges in the unlocked position.
Figure 7:
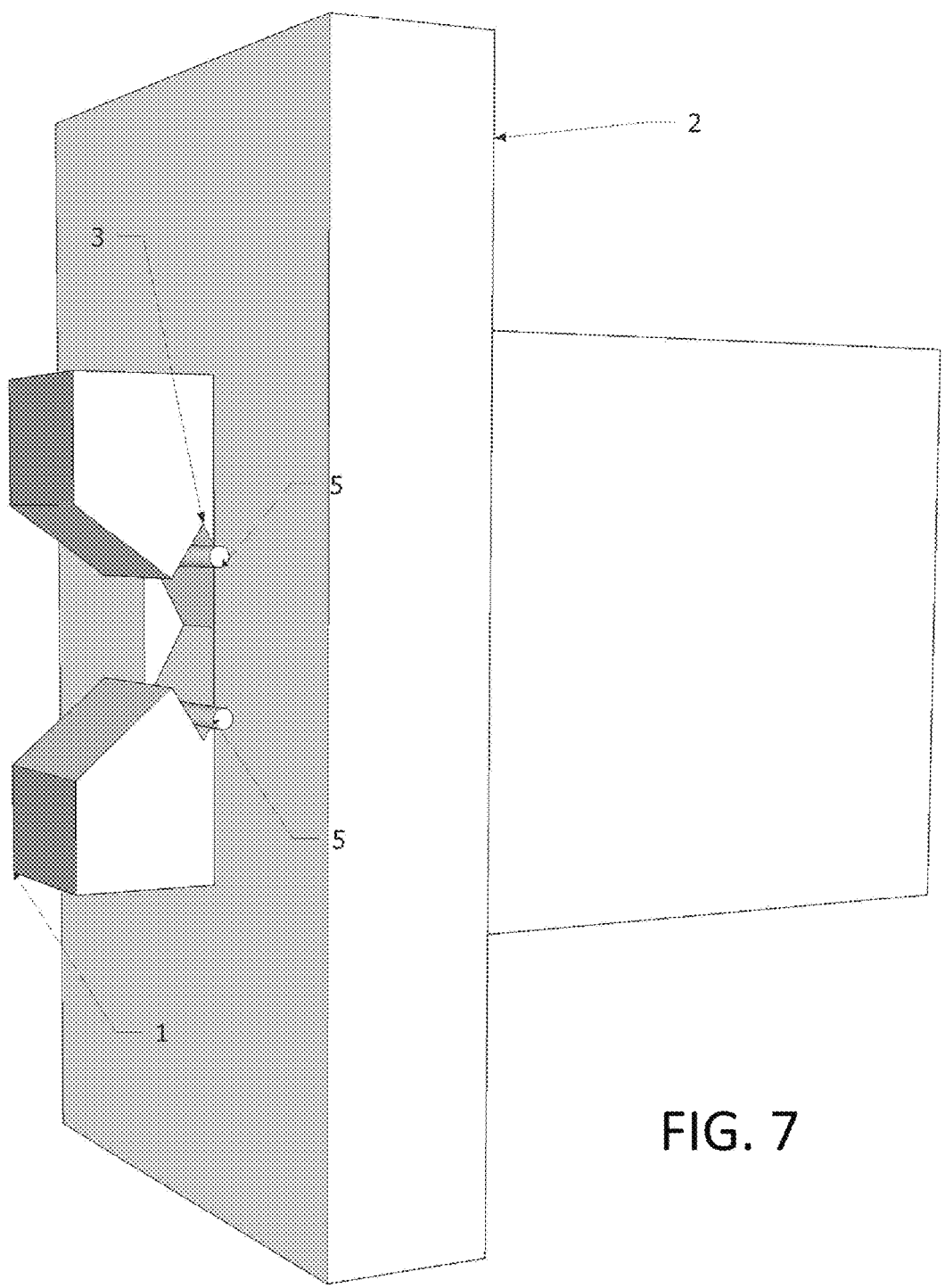
FIG. 7 is an exploded view of an alternative embodiment for the interior locking version of the present invention showing the tenon fully seated in the mortise with the wedges in the locked position.
Figure 8:
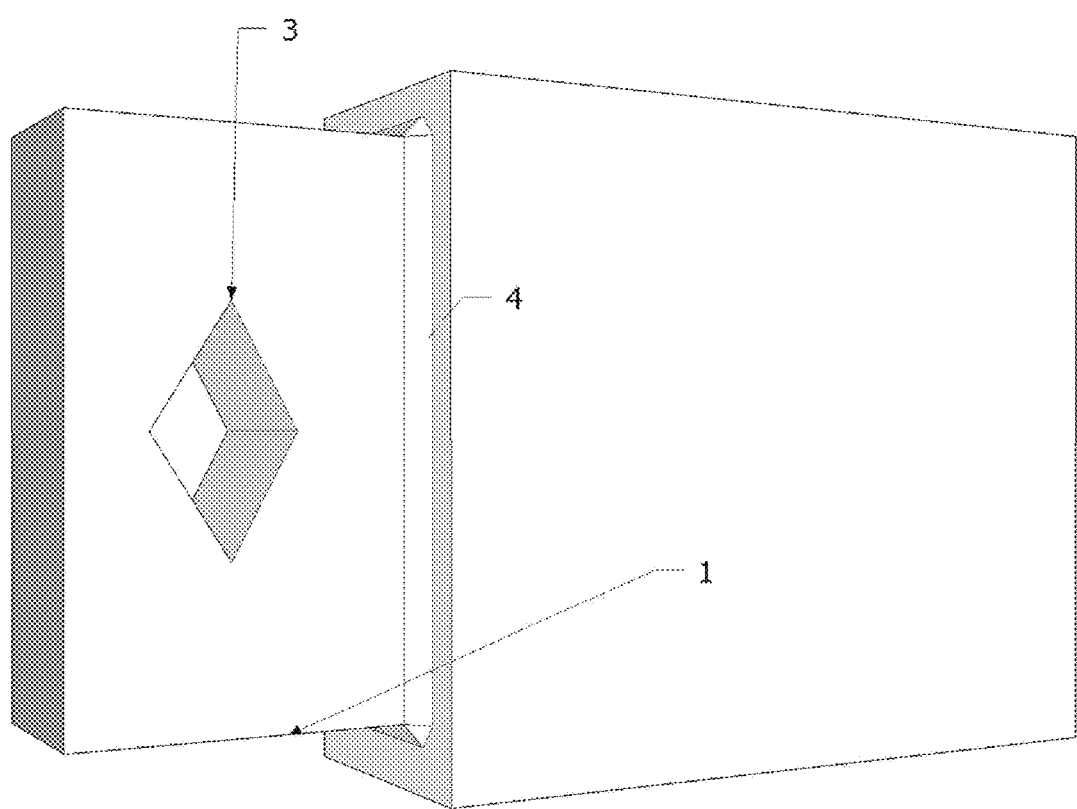
FIG. 8 is perspective view of an alternative embodiment of the interior locking version of the present invention illustrating a closed tenon end.

In an alternative embodiment, FIG. 5 illustrates the internal lock variant of the invention. Rather than a groove of tapered cross section formed on the face or edge of the tenon 1, that same groove 3 is provided through the body of the tenon, with an opening in the end to accept the wedge/lock mechanism. In this embodiment, the mortise 2 remains unchanged. FIG. 6 shows a fully seated tenon 1 in the mortise 2 with the wedge(s) in the unlocked position while FIG. 7 depicts the same relationship in the locked position. This embodiment will be known as the internal lock variant with an open end tenon. FIG. 8 is illustrative of another alternative embodiment which has an internal locking procedure, but has a closed end requiring the wedge(s) to be inserted once the tenon 1 is seated in the mortise 2. This will be known as the internal lock variant with a closed end tenon. Again, as with the first embodiment, the choice of locks is limitless. The given examples are provided for the purpose of description only and are not meant to be limiting in any way; the true scope of the invention is defined by the claims.

Figure 9:
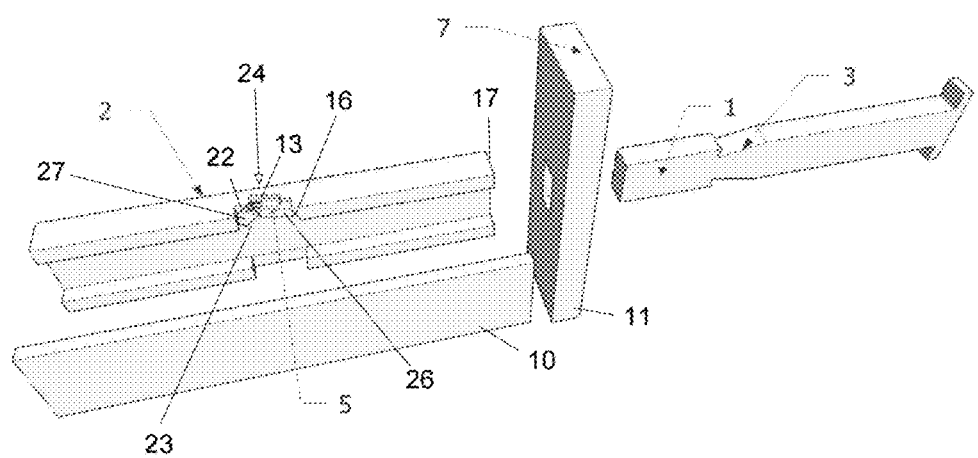
FIG. 9 is an exploded view of an alternative embodiment of the exterior locking version of the present invention showing the mortise, tenon and wedge components in a post and rail configuration.

FIG. 9 introduces yet another alternative embodiment containing the same basic components, but arranged to accommodate a post and rail variant, henceforth identified simply as the rail variant. The lengthened tenon 1 has a groove of tapered cross section 3 just as in the preferred embodiment, but the mortise 2 now resembles a rail. Mortises, for this invention, can be located anywhere and assume many configurations; they simply need to receive the tenon and provide a place of support against which the lock will work. For clarity, a side of the mortise 2 has been removed in the drawings depicting this alternative embodiment.

Figure 10:
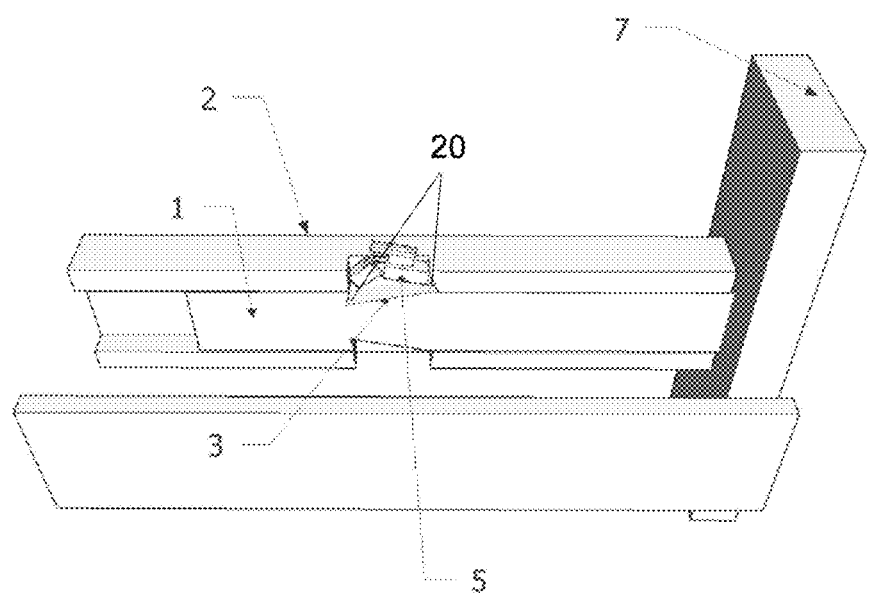
FIG. 10 is an exploded view of an alternative embodiment of the exterior locking version of the present invention showing the tenon fully seated in the mortise with the wedge in the unlocked position.
Figure 11A:
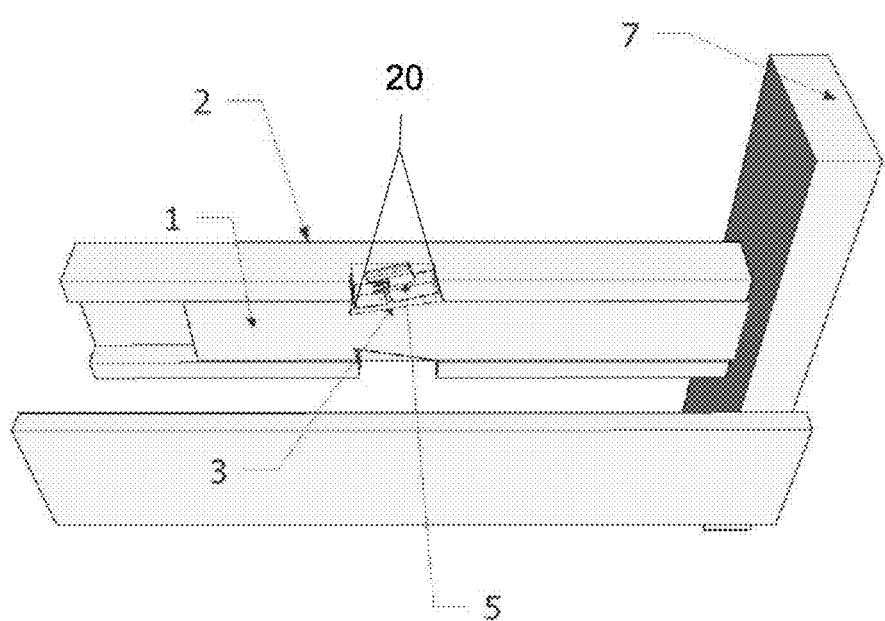
FIG. 11a is an exploded view of an alternative embodiment of the exterior locking version of the present invention showing the tenon fully seated in the mortise with the wedge in the locked position.
Figure 11B:
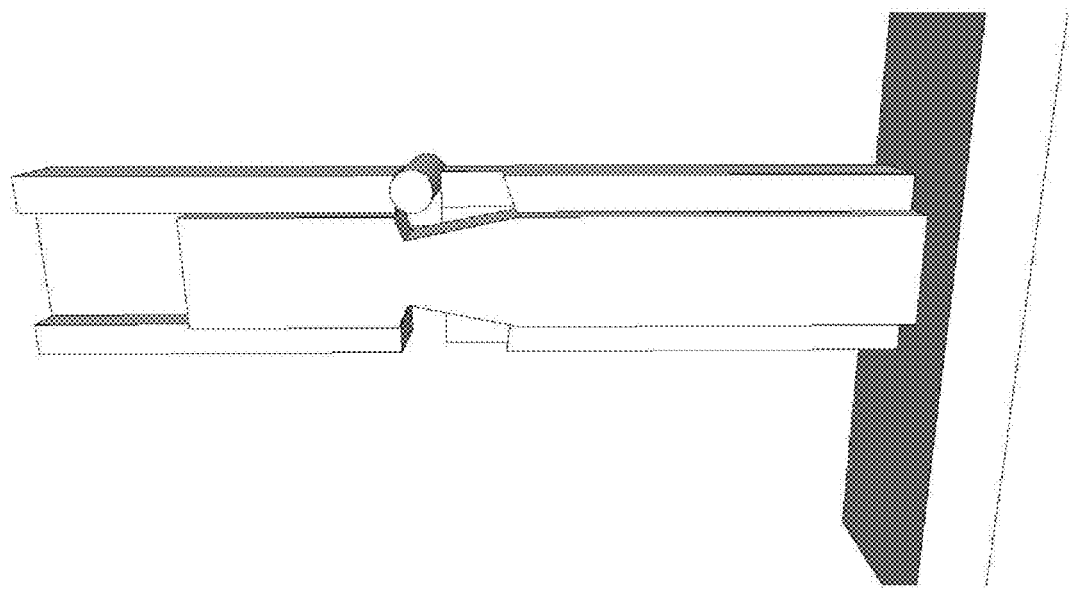
FIG. 11b is an exploded view of an alternative embodiment of the exterior locking version of the present invention showing a simple wedge and a different angle to the groove in the tenon.

The tenon 1 in this embodiment is a connector, rather than a structural member, even though it retains its structural qualities. The structural members in this variation are the mortise 2 and the post 7. The limiting action of the tenon 1 is provided by shoulders in this drawing, but could just as easily be accomplished by dowels, wedges, pins or any other means as long as the tenon 1 is prevented from passing completely through the post 7. While the beveled shoulders and cheeks of the previous embodiments are preferred, they are not required, as the elongated tenon 1 provides ample structural stability. In FIG. 10, the tenon 1 is shown fully seated with the wedge in the unlocked position, while FIG. 11a shows it in a locked position. In these drawings, a simple hinged type lock acts as the wedge by pressing against the groove in the tenon 1 and the inside face of an opening in mortise 2. FIG. 11b depicts the rail variant with a simple wedge in another alternative embodiment. The key point being that the groove can assume many shapes and the lock countless variations. An internal locking mechanism may also be used with both open and closed end variants of the tenon. Again, while more detailed explanations of these particular locks follow, the choice of locks is limitless. This example is provided for the purpose of description only and is not meant to be limiting in any way; the true scope of the invention is defined by the claims.

Figure 12:
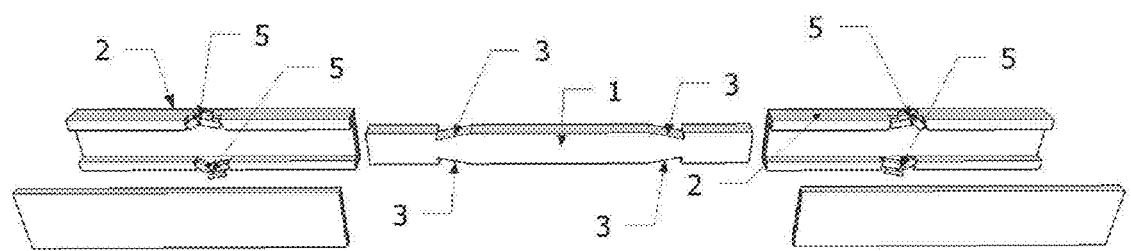
FIG. 12 is an exploded view of an alternative embodiment of the exterior locking version of the present invention showing the mortise, tenon and wedge components in a rail to rail configuration.

FIG. 12 is yet another alternative embodiment in a configuration similar to the aforementioned version, but with a tenon 1 having two identical ends and lacking a limiting feature of its own (e.g. shoulders). In this version, wedges 5 are used to combine two mortises 2. While this drawing depicts a two faced tenon 1 without a limiting feature, there is nothing in the invention that prevents one from being added. Indeed, a few versions use pins or dowels centered on the tenon 1 to facilitate assembly or provide a locator for a post sandwiched between the two mortises 2. There is no limit to the number or location of the mortises, tenons or posts.

Figure 13:
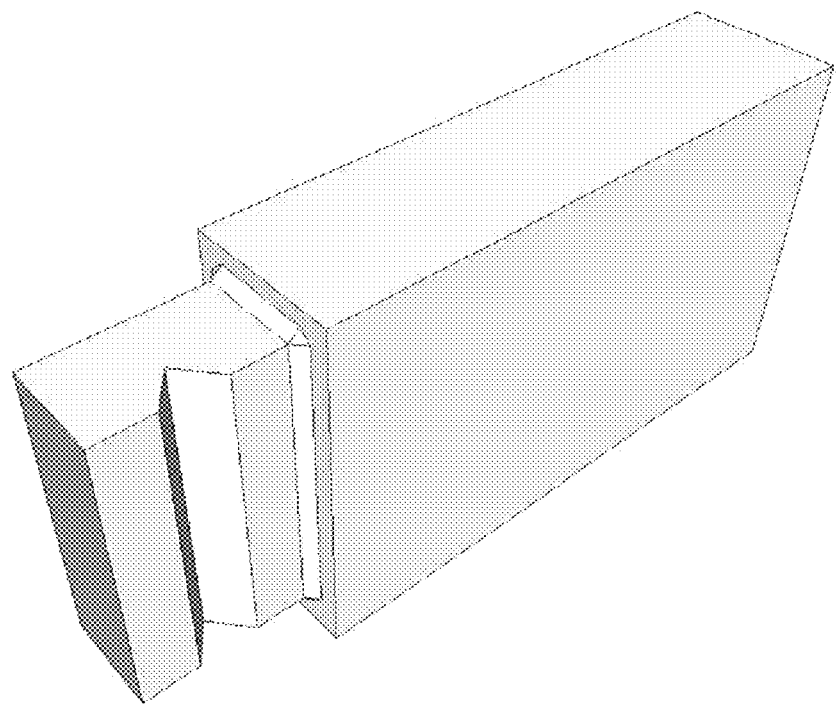
FIG. 13 is a perspective view of an alternative embodiment of the exterior locking version of the present invention showing a single groove in the longest face of the tenon.

Moving to FIG. 13, this drawing depicts an alternative embodiment of the basic tenon with a single groove of tapered cross section cut in the long face of the tenon. There is nothing limiting as to number or placement of the grooves or, indeed, the number of sides used in the forming of the tenon and/or mortise; any multisided design will work. A round structural member commonly referred to as a dowel, can have a round tenon possessing a groove, or grooves, of tapered cross section as well.

Figure 14:
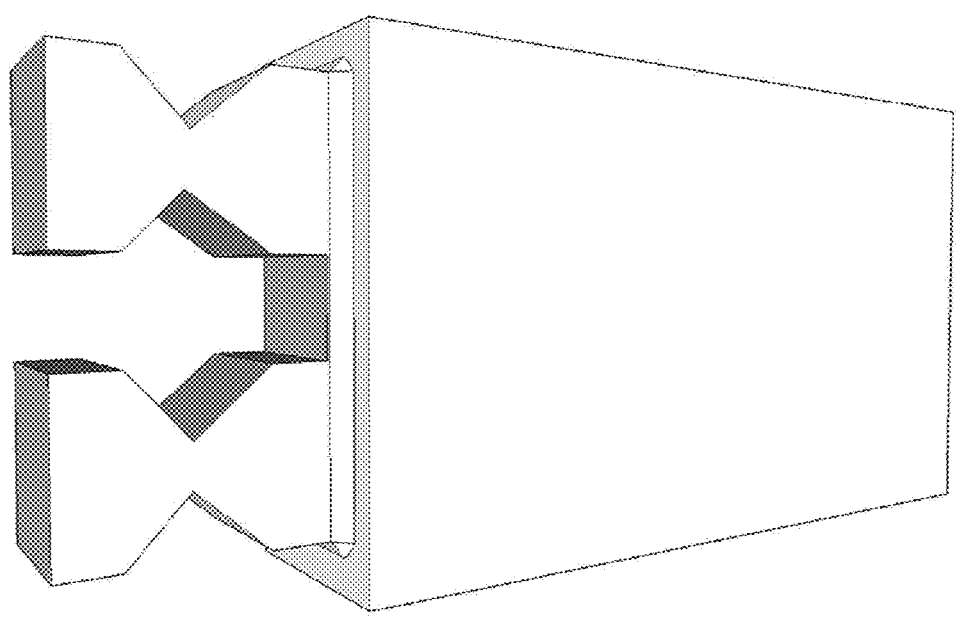
FIG. 14 is a perspective view of an alternative embodiment of the present invention illustrating a multiple lock tenon end.

FIG. 14 is another alternative embodiment featuring a tenon capable of accepting multiple wedges/locks in both the internal and/or external variations. There is nothing limiting as to placement or number of tenons used for a particular structural member; wider members may require multiple tenons and locks and may be positioned anywhere for best advantage.

Figure 15:
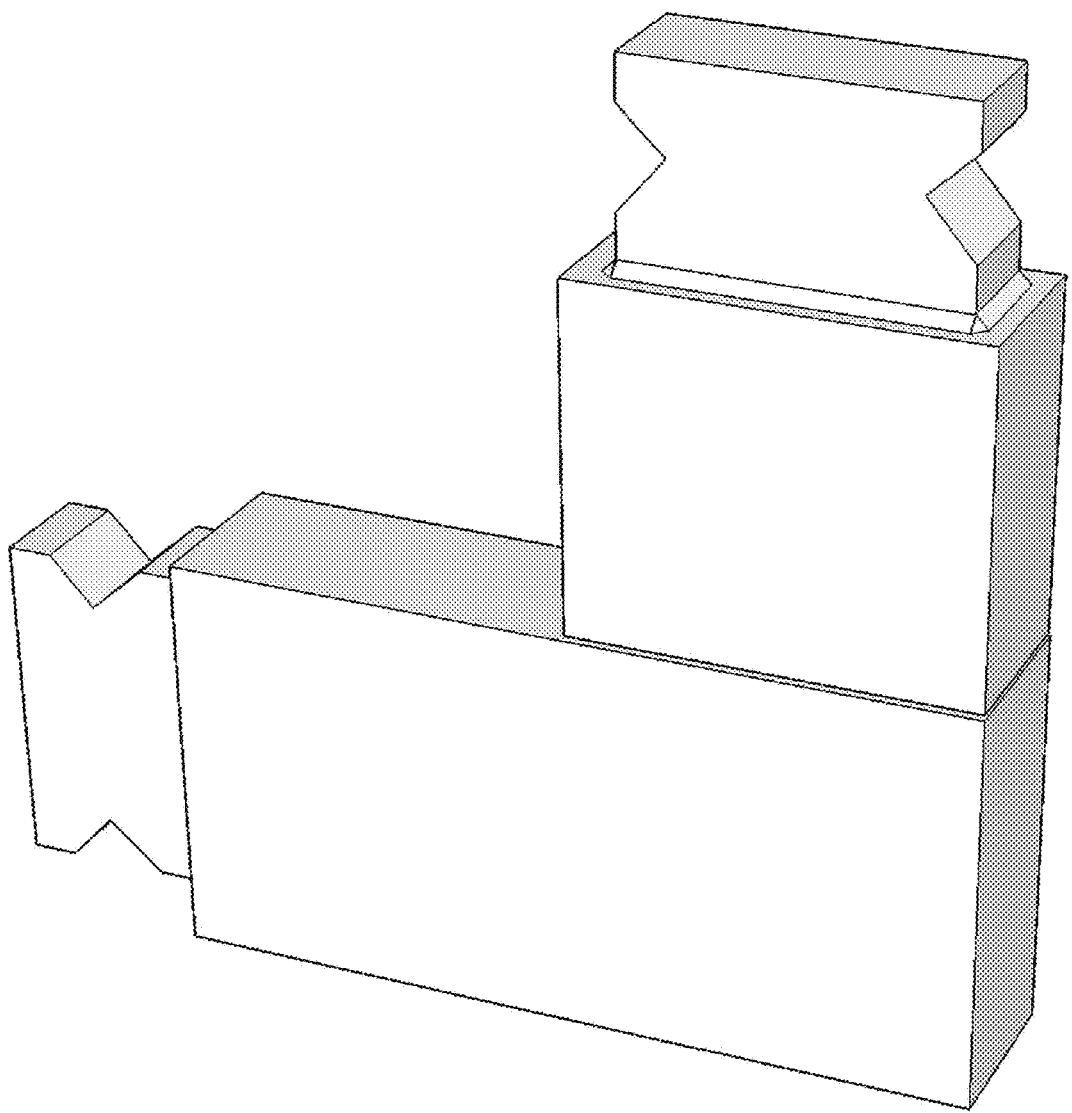
FIG. 15 is a perspective view of an alternative embodiment of the present invention illustrating a dual tenon configuration.
Figure 16:
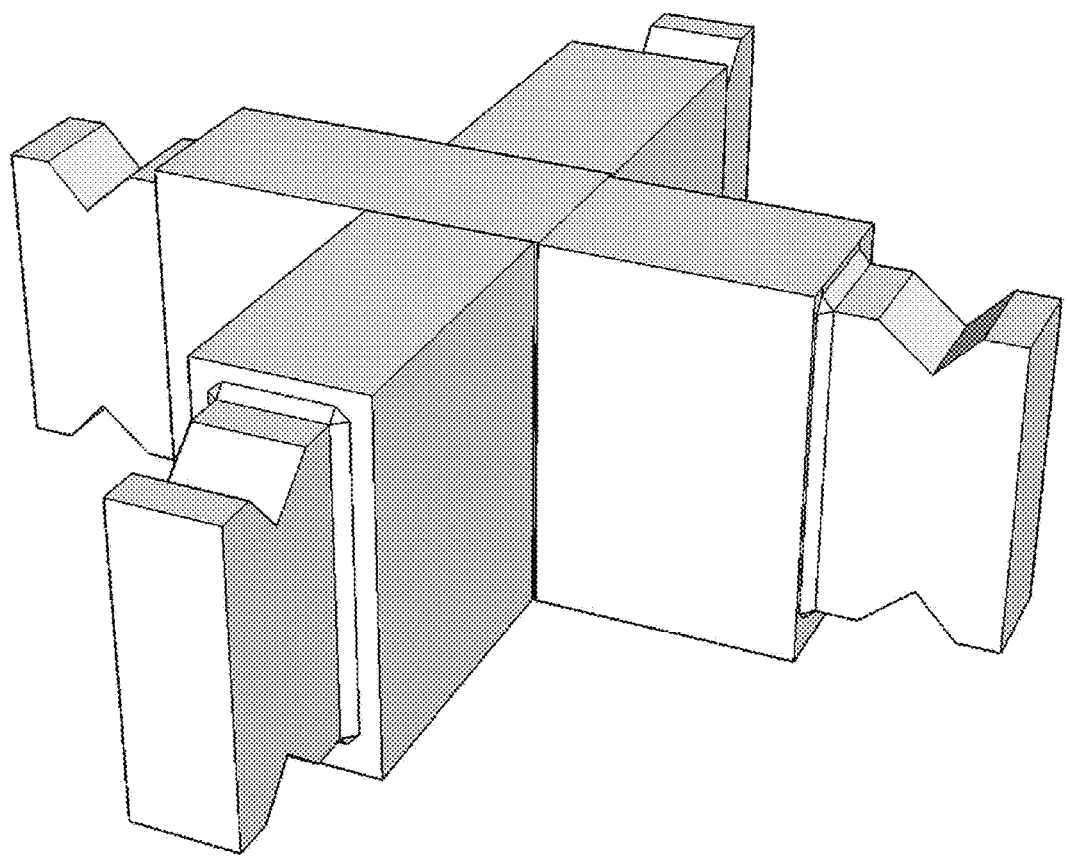
FIG. 16 is a perspective view of an alternative embodiment of the present invention illustrating a multiple tenon configuration.

FIG. 15 is an alternative embodiment possessing two tenons, but located on different planes, while FIG. 16 is yet another alternative embodiment showing multiple tenons in different dimensions. Again, there is nothing limiting as to number or placement of tenons.

Figure 17:
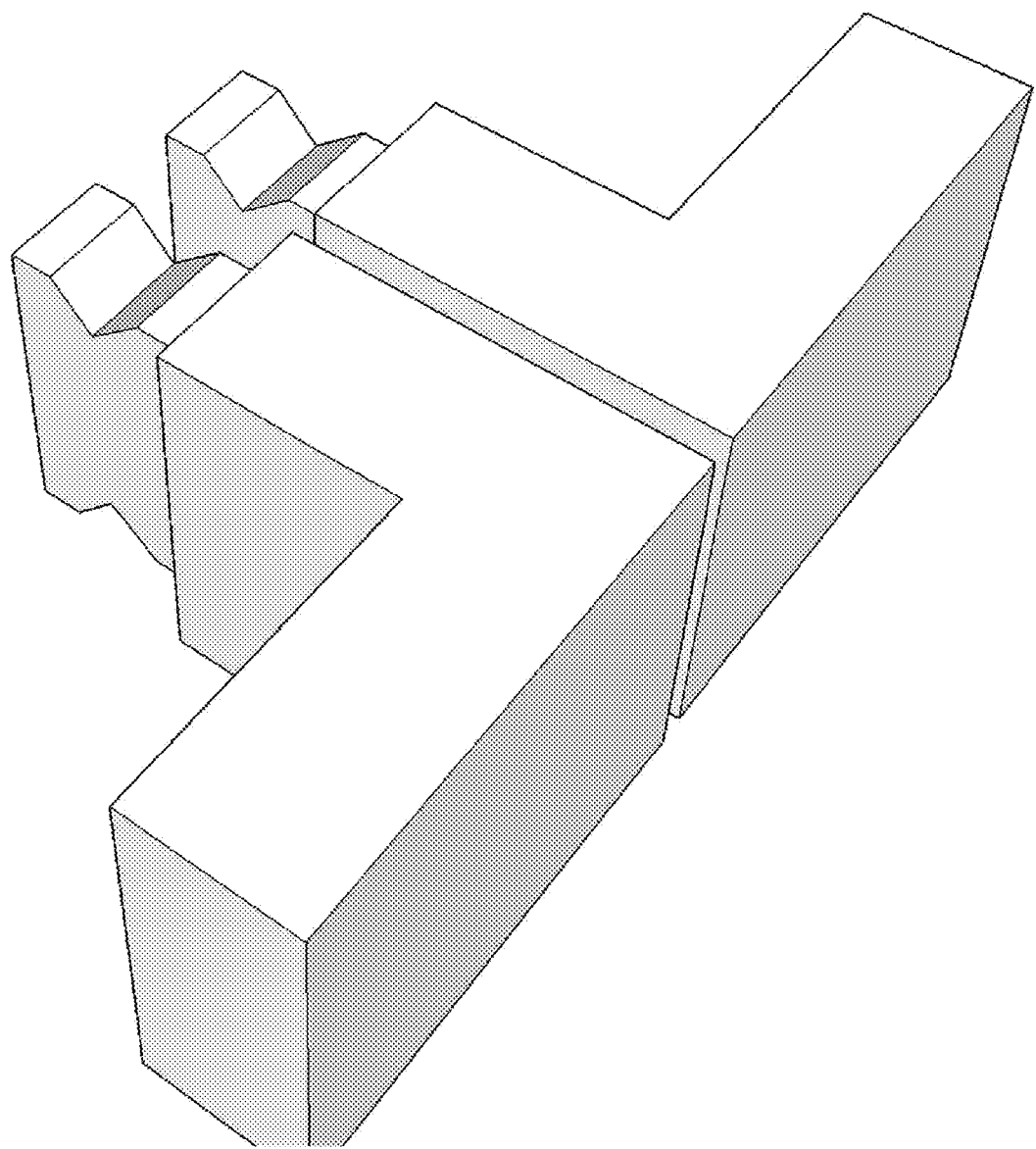
FIG. 17 is a perspective view of an alternative embodiment of the present invention illustrating multiple tenons joined by a common lock.

Two or more structural members may be connected in yet another alternative embodiment as FIG. 17 illustrates. In this drawing, two tenons are joined together using a single mortise and lock. Scaffolding, tables and other structures will take full advantage of this particular variation of the invention. There is nothing limiting as to number or placement of structural members which may be joined using this invention.

Figure 18:
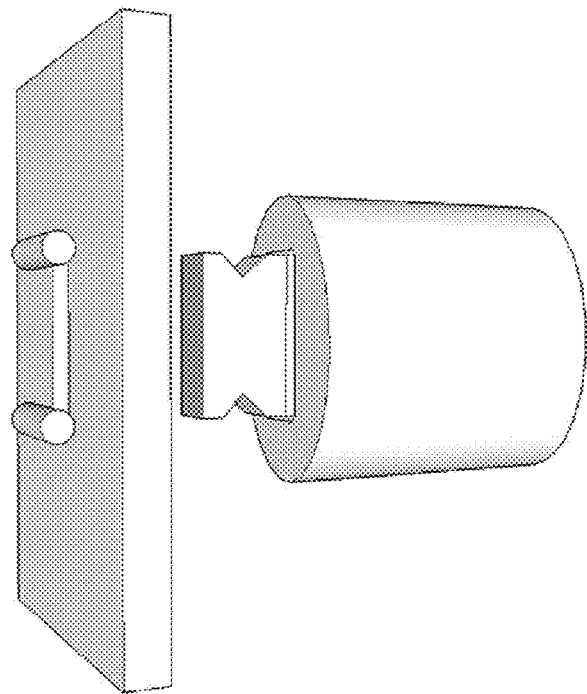
FIG. 18 is an exploded view of an alternative embodiment of the present invention illustrating a dowel connection.
Figure 19:
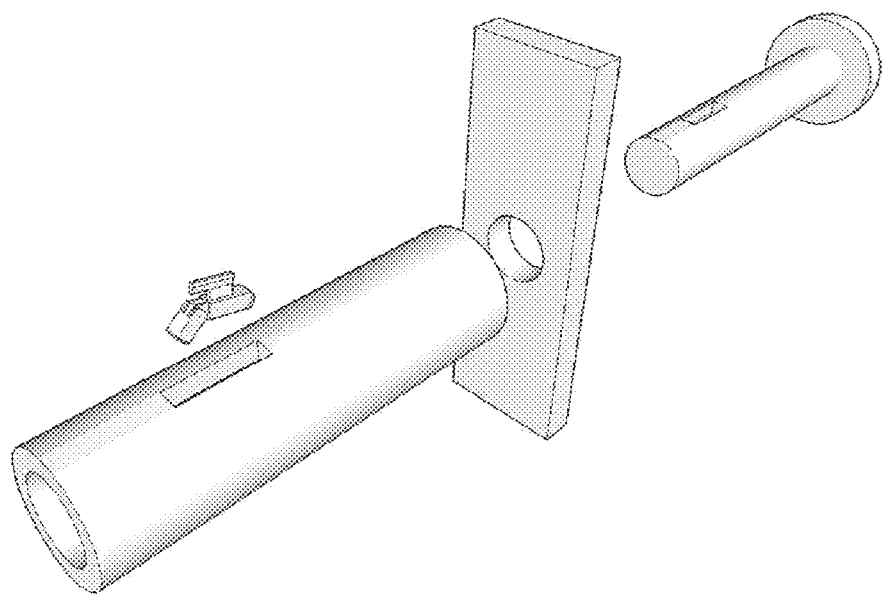
FIG. 19 is an exploded view of an alternative embodiment of the present invention illustrating a tube and dowel configuration.

Aesthetically, dowels present options to furniture makers and FIG. 18 showcases that alternative embodiment utilizing an external locking configuration. FIG. 19 takes that concept further and illustrates a tube and dowel alternative embodiment utilizing the same simple hinge lock as used in the previously described rail version. Even though not expressly depicted, internal locking variants are perfectly acceptable in both these versions, just as described in the rail version of the invention.

The following drawings all depict various locks which act as, or compliment the wedge(s). As stated previously, there are limitless methods for accomplishing the locking action which deploys the wedge and locks the tenon to the mortise, but these particular examples explain the invention in the simplest of terms.

Figure 20A:
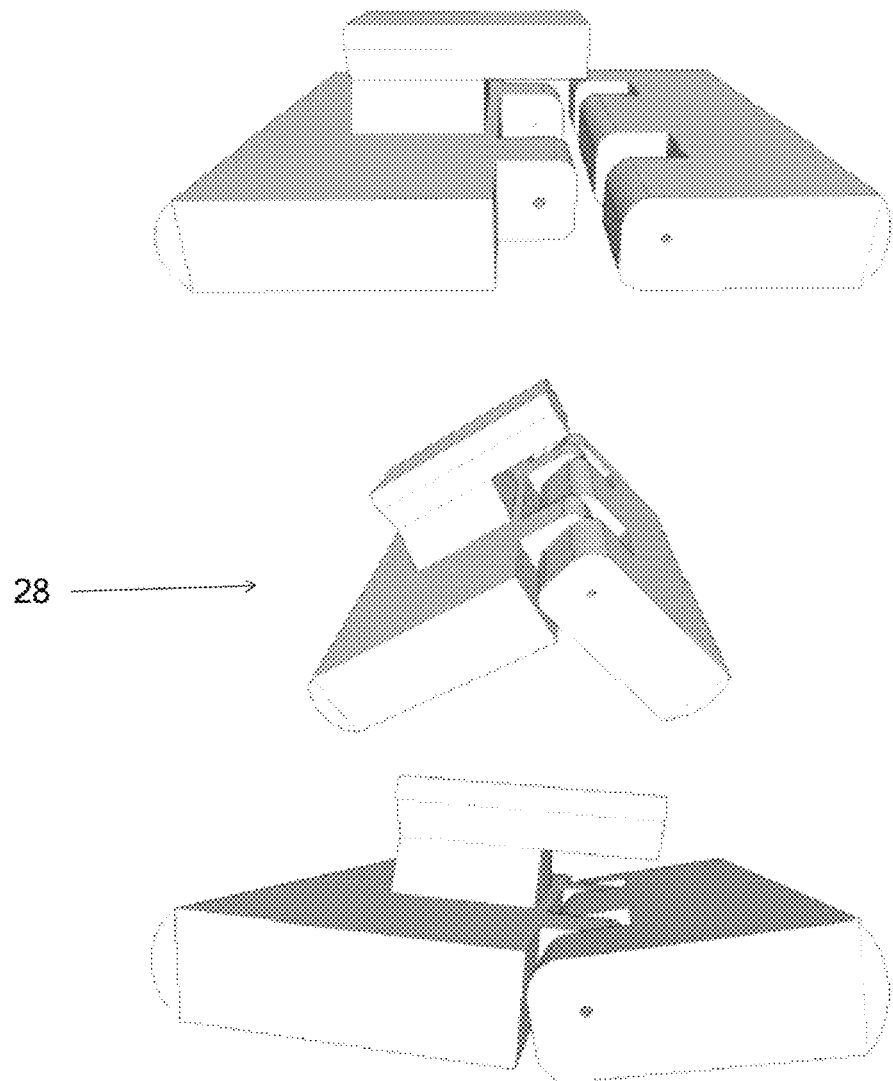
FIG. 20a is an exploded view of the preferred embodiment of the present invention showing the lock in both locked and unlocked positions.
Figure 20B:
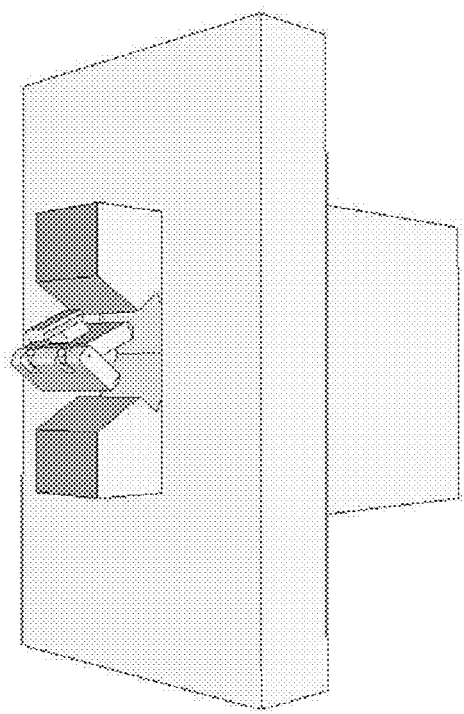
FIG. 20b is a perspective view of the preferred embodiment of the present invention showing the lock in an unlocked position with the internal lock variant of the invention.

FIG. 20a shows the aforementioned hinge lock in a particular embodiment. The top drawing is an exploded view highlighting the simplicity of the lock while the middle drawing shows it in an unlocked position and the bottom drawing depicts a locked position. FIG. 20b features the lock in an internal lock/open end variant of the invention in an unlocked position. A handle is situated in the middle of the device for balance and ease of use; a flat knob is provided for pushing the lock closed while a recess allows it to be gripped for unlocking. The lock functions by being somewhat longer, at full extension, than the distance between the mortise and the groove in the tenon. When the lock is forced into the smaller space, it pushes the tenon away from the mortise until full extension is achieved by the lock. By allowing the lock to traverse just past 180 degrees and stop, tension is maintained between the tenon groove and the mortise until the action is reversed and the lock released. Providing the room necessary for the lock to traverse through 180 degrees can be accomplished in many ways. For example, the lock itself may have a concave profile, the ends of the lock (the actual wedge) may be greater in thickness that the hinge portion, there may be a depression created behind the lock or one or both ends of the lock may rest on slightly elevated ramps. This design lends itself to all the embodiments of the invention, the specifics of which are described below. Again, due to the overwhelming number of possible designs, these descriptions are not to be considered as limiting the invention to the embodiments described. Rather, the true scope of the invention is defined by the claims.

Figure 21A:
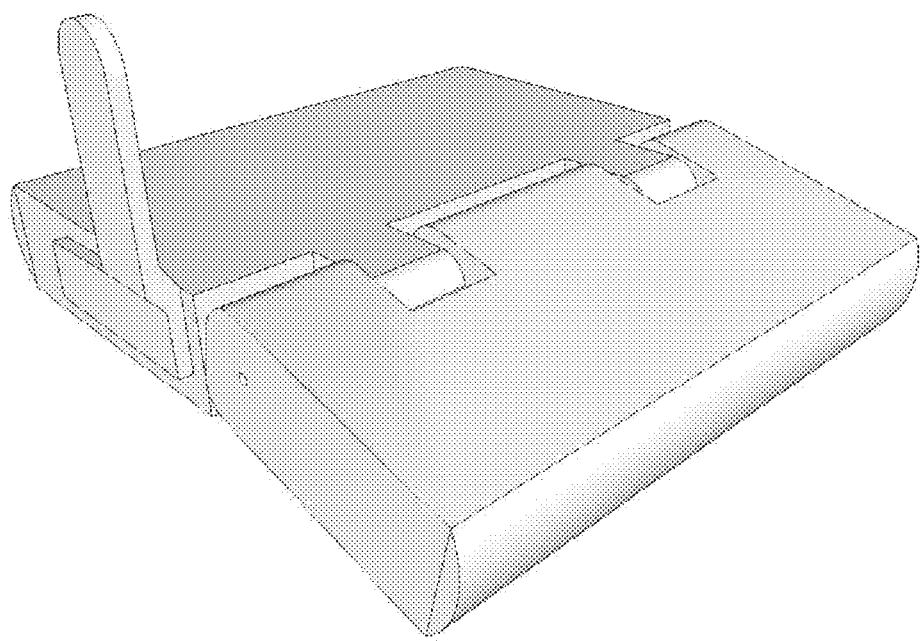
FIG. 21a is a perspective view of an alternative embodiment of the present invention showing the handle placed on the side of the lock for use in the interior locking versions of the invention.
Figure 21B:
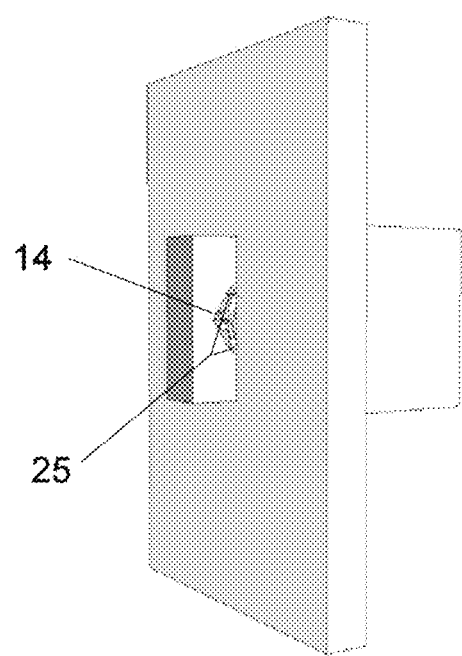
FIG. 21b is a perspective view of the preferred embodiment of the present invention showing the lock in an unlocked position with the internal lock variant of the invention in a closed end tenon.

FIG. 21a shows an alternative embodiment for the hinge lock to be used with the internal locking tenon with the closed end. The lock itself functions as described above, but has a handle located on the side to allow the lock to be inserted into the internally grooved space of that particular tenon, as depicted in FIG. 21b.

Figure 22:
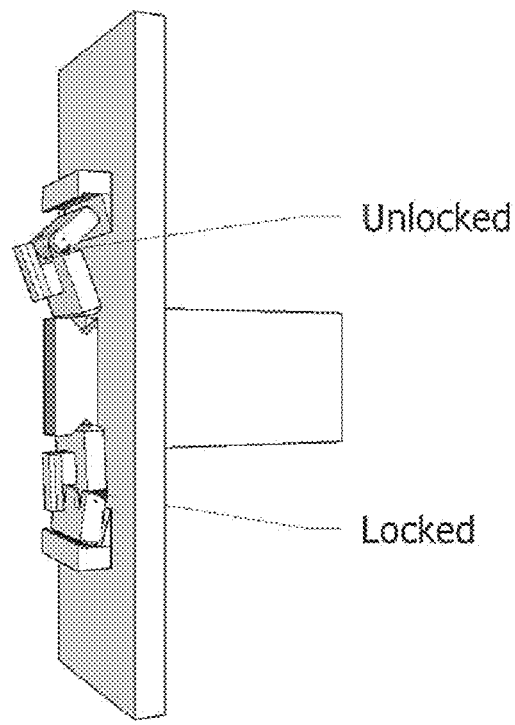
FIG. 22 is a perspective view of the preferred embodiment of the present invention showing one lock in a locked position and a second lock in an unlocked position.

FIG. 22 illustrates two hinge locks being employed with the preferred embodiment of the invention. The top lock is shown in the unlocked position while the lower lock is shown in the locked position. The ramps described above which elevate the lock enough to allow movement through 180 degrees can be seen in the drawing.

Figure 23:
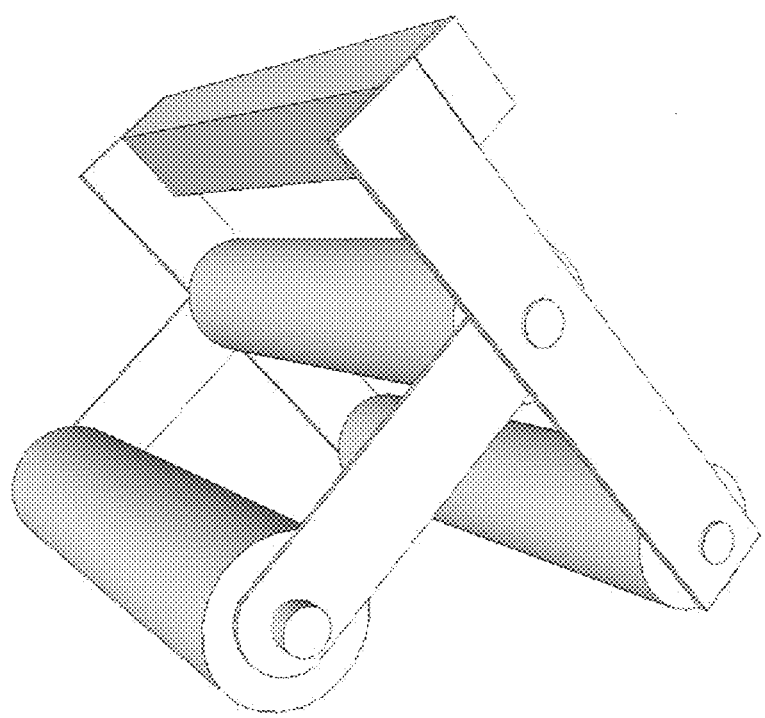
FIG. 23 is a perspective view of an alternative embodiment of the present invention showing rollers as the wedge component.

A roller version of the basic hinge lock, another alternative embodiment, is featured in FIG. 23. While the handle location is a bit different, it still affords easy actuation. The roller version accomplishes the 180 degree plus transit by having naturally thicker wedge ends than the hinged interior.

Figure 24:
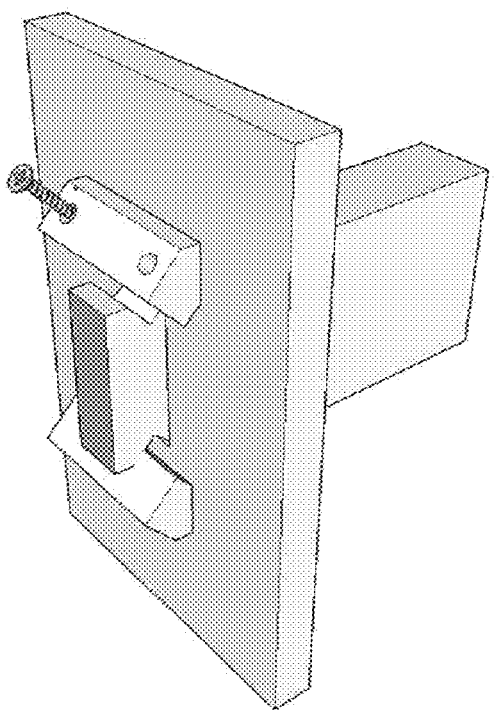
FIG. 24 is an exploded view of an alternative embodiment of the present invention showing simple wedges semi-permanently attached to the mortise.

FIG. 24 illustrates an alternative embodiment of the lock design which provides semi-permanent attachment. This lock is a simple wedge which can be attached to the mortise with screws, bolts or other means; it can also be used with any number of clamps. This method of securing the invention's joinery will be useful for those with limited need of portability, such as those with vacation homes, dorms and hotel rooms, where the ability to quickly disassemble entire furniture suites would be considered a negative feature of the invention. The drawing also serves to highlight the range of possibilities when considering a lock for the invention. Although the external lock version is shown, any embodiment of the invention can use this particular lock with minor modifications.

Figure 25:
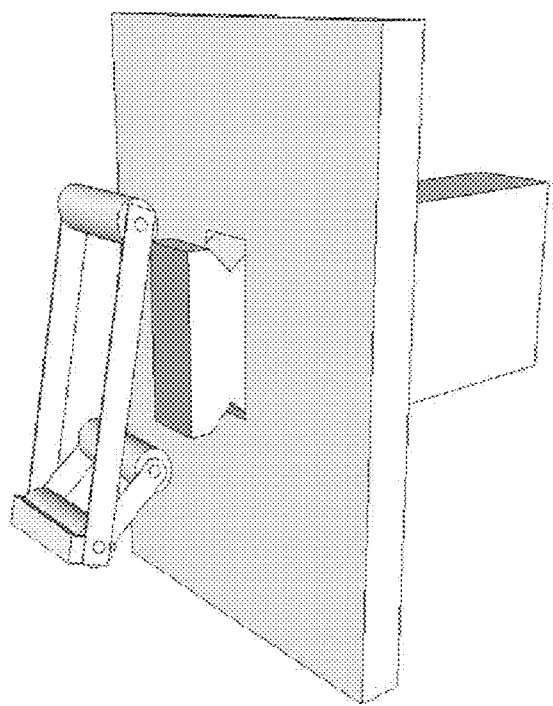
FIG. 25 is an exploded view of an alternative embodiment of the present invention showing a variation of the roller lock which compresses rather than spreads.

Another alternative embodiment of the lock is shown in FIG. 25. This variant is designed for external locking models of the invention and features self contained operation. It functions similarly to the basic hinge lock in that it derives its clamping and holding energy by rotating the assembly past 180 degrees, but in this configuration, it is compression energy used, not tensile. While two wedges (in the form of rollers) are shown, this device could easily adopt a single wedge design or one that uses a mounted hinge similar to a standard ammunition box clamp.

Figure 26:
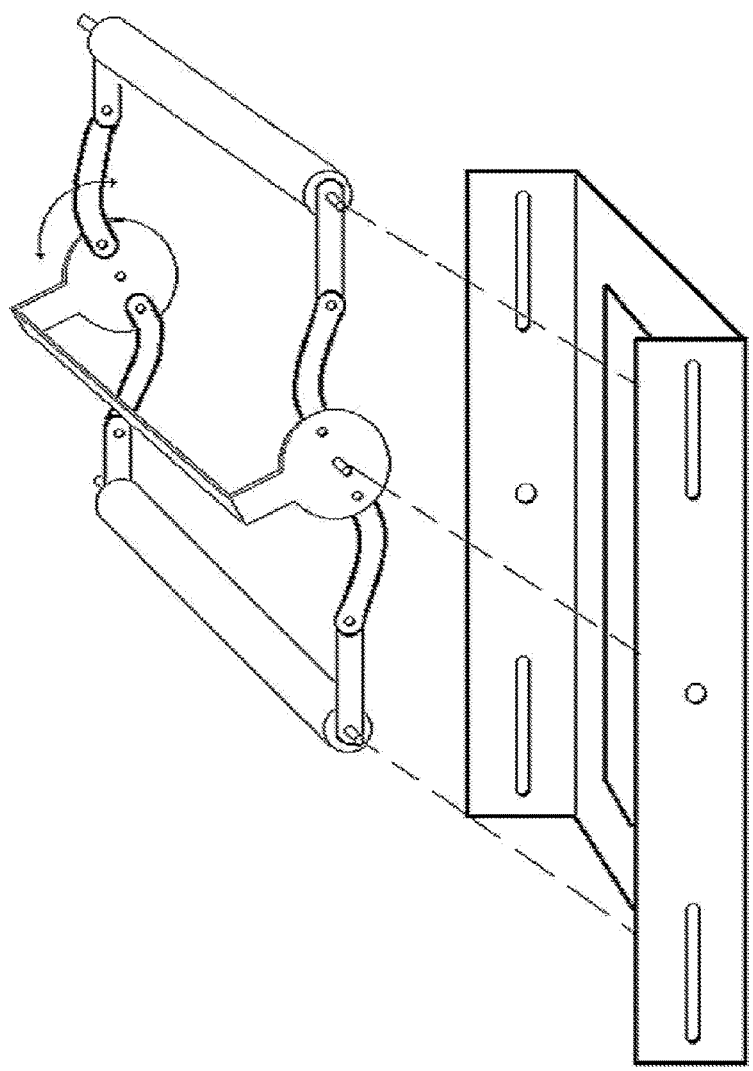
FIG. 26 is an exploded view of an alternative embodiment of the present invention showing a variation of the roller lock which compresses rather than spreads and mounts to the mortise.
Figure 27:
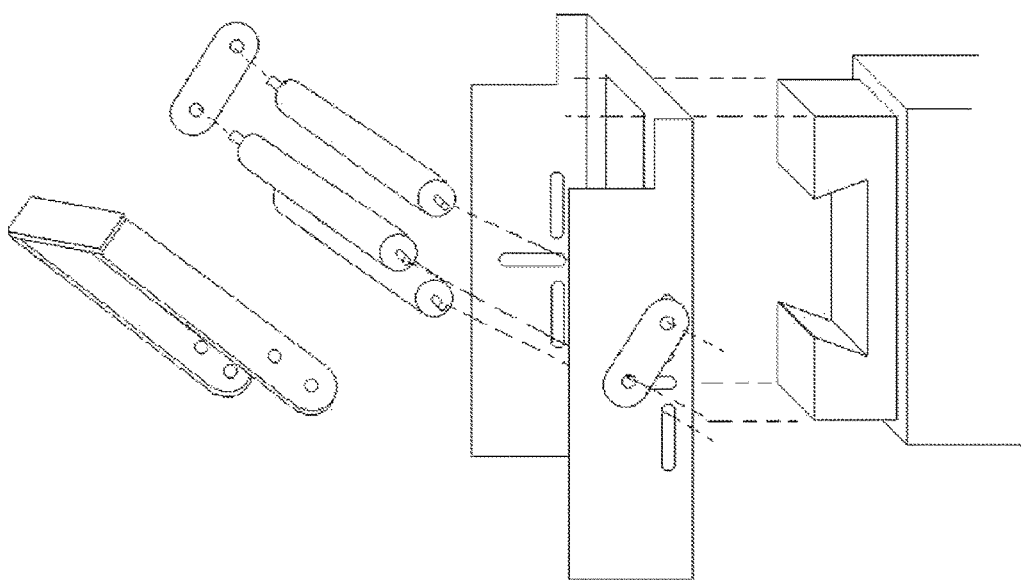
FIG. 27 is an exploded view of an alternative embodiment of the present invention showing a variation of the roller lock which mounts to the mortise and is used with the open ended, interior lock tenon.

Slightly more complicated alternative embodiments of the lock are featured in FIG. 26 and FIG. 27. The drawing in FIG. 26 depicts the same operation as given in the previous embodiment and is meant for external lock designs, but the actuating components are mounted to a plate which is, in turn, mounted at the mortise opening. The benefit derived by this device is that everything necessary to operate the invention is permanently attached; no need for loose (and thus, losable) locks. Likewise, the version illustrated in FIG. 27 possesses the same benefits as those described above, but is designed for the internal lock variant with the open end tenon, and uses tensile energy rather than compression.

The foregoing detailed description is given primarily for clearness of understanding and no unnecessary limitations are to be inferred. No material has been claimed or specified; mortises, tenons and all manner of restraints, wedges and locks are not limited in any way as to composition. Indeed, all items may be manufactured using wood, steel, plastic or any other such material as may be deemed practicable, including combinations of two or more materials (e.g. metal plates and/or brackets used with wood connectors).

It is not intended to limit the invention to the above examples only; many variations are possible without departing from the overall scope of the invention, or its inventive concept. Such variations are contemplated as being a part of the present invention.

I claimed:

1. A mortise and tenon joint of two structural members comprising:
    an upright element and a perpendicular element, said upright element and said perpendicular element comprising said two structural members, and
    a mortise formed in one structural member, said through mortice having a shoulder, a front opening, a rear opening, and a mortise cavity, and
    a tenon of any length, but wherein the other dimensions of the tenon are slightly less than those of the mortise, thereby facilitating easy insertion and extraction of the tenon into and out of the mortise, wherein the shoulder of said tenon is beveled, and the front opening of said mortise is correspondingly beveled such that when the tenon is introduced into the mortise the tenon is urged to center within the mortise cavity, wherein the tenon has a first groove of tapered cross section across the tenon, the first groove remaining partially covered by the rear opening of said mortise when the tenon is fully seated in the mortise,
    a first movable wedge, the first moveable wedge intersecting the mortise when the tenon is fully seated in the mortise, the first moveable wedge configured to be placed into engagement with the first groove, the first moveable wedge then acting upon both the first groove and the mortise by urging the first groove and the mortise in opposite directions, to draw the tenon tightly into the mortise thereby preventing the structural members from separating until the first moveable wedge is withdrawn, and
    a locking system, the locking system configured to operate as said first moveable wedge, the locking system comprising two articulating members, said two articulating members comprised of a first articulating member and a second articulating member wherein said first articulating member is longer than said second articulating member, said two articulating members connected along one common side such that they form a hinged structure.

2. The mortise and tenon joint as described in claim 1, wherein the locking system is configured to pivot along the common connection freely to an open side of the joint, and having a stop which limits travel to slightly more than 180 degrees on a closed side of the joint, the locking system's travel being confined by a restraint on the mortise end of the system and by the first groove in the tenon on the opposite end of the system, the locking system being longer than the void between the stop and the first groove, the locking system configured to urge said first articulating member into the void between the mortise restraint and the first groove, forcing the tenon away from the mortise restraint until the articulating members of the locking system traverse slightly past 180 degrees and stop, thereby fixing the locking system in place, providing tensile force to maintain constant pressure against the tenon, the mortise restraint, and the tenon, and further locking the tenon to the mortise until the locking system is released.

3. The mortise and tenon joint of claim 1 further comprising:
    a second groove, said second groove configured such that the first and second grooves are oriented with bilateral symmetry with respect to an axis along the length of said tenon,
    a second moveable wedge,
    wherein said first moveable wedge is urged into said first groove and said second moveable wedge is urged into said second groove, wherein said first moveable wedge and said second moveable wedge cooperatively urge both said mortise and said tenon to draw the tenon tightly into the mortise.

4. A mortise and tenon joint of three structural members comprising:
    an upright element and a first perpendicular element, comprising two of said three structural members,
    a mortise, said mortise formed in the first perpendicular element,
    a tenon, of any length, said tenon comprising the third structural member, said tenon configured wherein the dimensions of the tenon are slightly less than those of the mortise, said tenon oriented perpendicularly as a second perpendicular element,
    said upright element having an opening allowing the tenon to pass through, the tenon having shoulders, the tenon configured to connect the upright member and the first perpendicular element, said tenon having a first groove of tapered cross section across the tenon, the first groove remaining partially covered by an opening in said mortise when the tenon is fully seated in the mortise,
    said mortise and tenon joint further comprising a first movable wedge, the first moveable wedge intersecting the mortise when the tenon is fully seated in the mortise, the first moveable wedge configured to be forcibly placed into engagement with the first groove, and act upon both the first groove and the mortise, to draw the tenon tightly into the mortise thereby preventing the structural members from separating until the first moveable wedge is withdrawn, and a locking system, the locking system configured to operate as said first moveable wedge, the locking system comprising two articulating members, said two articulating members comprised of a first articulating member and a second articulating member wherein said first articulating member is longer than said second articulating member, said two articulating members connected along one common side such that they form a hinged structure.

5. The mortise and tenon joint as described in claim 4, wherein the locking system is configured to pivot along the common connection freely to an open side of the joint, and having a stop which limits travel to slightly more than 180 degrees on a closed side of the joint, the locking system's travel being confined by a restraint on the mortise end of the system and by the first groove in the tenon, the locking system being longer than the void between the stop and the first groove, the locking system configured to urge the articulating members of the locking system into the void between the mortise restraint and the first groove, with the tenon being urged away from the mortise restraint until the articulating members traverse slightly past 180 degrees and stop, thereby fixing the locking system in place, providing tensile force to maintain constant pressure against the tenon and the mortise restraint, and locking the tenon to the mortise until the locking system is released.

6. The mortise and tenon joint of claim 4 further comprising:

a second groove, said second groove configured such that the first and second grooves are oriented with bilateral symmetry with respect to an axis along the length of said tenon, a second moveable wedge, wherein said first moveable wedge is urged into said first groove and said second moveable wedge is urged into said second groove, wherein said first moveable wedge and said second moveable wedge cooperatively urge both said mortise and said tenon to draw the tenon tightly into the mortise.

* * * * *